United States Patent
Atm

(10) Patent No.: US 7,203,696 B2
(45) Date of Patent: Apr. 10, 2007

(54) DYNAMIC REGISTRY PARTITIONING

(75) Inventor: Shafiqul Khalid Atm, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 175 days.

(21) Appl. No.: 10/652,215

(22) Filed: Aug. 29, 2003

(65) Prior Publication Data

US 2005/0050084 A1 Mar. 3, 2005

(51) Int. Cl.
*G06F 17/00* (2006.01)
*G06F 15/16* (2006.01)

(52) U.S. Cl. .............. 707/102; 707/2; 707/10; 707/101; 707/103 Z; 707/104.1; 709/203

(58) Field of Classification Search ............ 707/2, 707/4, 10, 101, 102, 103 Z, 104.1; 717/107; 715/536; 709/203, 206, 231; 713/100; 705/7
See application file for complete search history.

(56) References Cited

U.S. PATENT DOCUMENTS

| | | | |
|---|---|---|---|
| 5,903,753 A | 5/1999 | Bramnick et al. | |
| 6,163,855 A | 12/2000 | Shrivastava et al. | |
| 6,347,331 B1 | 2/2002 | Dutcher et al. | |
| 6,374,401 B1 * | 4/2002 | Curtis | 707/175 |
| 6,381,735 B1 | 4/2002 | Hunt | |
| 6,430,556 B1 * | 8/2002 | Goldberg et al. | 707/4 |
| 6,557,164 B1 * | 4/2003 | Faustini | 717/107 |
| 6,567,826 B1 | 5/2003 | Fischer et al. | |
| 6,567,977 B1 | 5/2003 | Kumar | |
| 6,578,045 B1 | 6/2003 | Gray et al. | |
| 6,763,370 B1 * | 7/2004 | Schmeidler et al. | 709/203 |
| 6,779,179 B1 * | 8/2004 | Romm et al. | 717/178 |
| 6,917,958 B1 * | 7/2005 | Howe et al. | 709/203 |
| 6,918,113 B2 * | 7/2005 | Patel et al. | 717/178 |
| 6,920,555 B1 * | 7/2005 | Peters et al. | 713/100 |
| 2001/0008019 A1 * | 7/2001 | Vert et al. | 714/1 |
| 2001/0032335 A1 | 10/2001 | Jones | |

(Continued)

FOREIGN PATENT DOCUMENTS

WO    WO 01/67379 A    9/2001

OTHER PUBLICATIONS

Walter L. Hursch, et al., Automating the Evolution of Object-Oriented Systems, International Symposium on Object Technologies for Advanced Software, Mar. 1996, 20 pages, Springer-Verlag.

(Continued)

*Primary Examiner*—Thuy N. Pardo
(74) *Attorney, Agent, or Firm*—Amin, Turocy, & Calvin, LLP

(57) ABSTRACT

A system and method of providing access to information stored in a system registry is provided. The system and method can further facilitate a generic (e.g., application and/or operating system independent) manner for dynamic partitioning of the system registry. The present invention facilitates providing of customized view(s) of the system registry to client(s), component(s) and/or application(s). Customization can be based on version, computer configuration, user and/or other suitable information. Further, the customized view of the system registry can be manipulated at runtime. Additionally and/or alternatively, low level component(s) (e.g., client(s) and/or application(s)) can also be given access to a dynamic partition data store to manipulate (e.g., add, delete and/or modify) redirection information (e.g., via interface component(s)).

23 Claims, 6 Drawing Sheets

U.S. PATENT DOCUMENTS

| | | | | |
|---|---|---|---|---|
| 2002/0083183 | A1* | 6/2002 | Pujare et al. | 709/231 |
| 2002/0091763 | A1* | 7/2002 | Shah et al. | 709/203 |
| 2002/0103824 | A1 | 8/2002 | Koppolu, et al. | |
| 2002/0174215 | A1* | 11/2002 | Schaefer | 709/224 |
| 2003/0009538 | A1* | 1/2003 | Shah et al. | 709/219 |
| 2003/0182598 | A1* | 9/2003 | Ma et al. | 714/39 |
| 2003/0233647 | A1* | 12/2003 | Blaser et al. | 717/174 |
| 2004/0002955 | A1* | 1/2004 | Gadbois et al. | 707/2 |
| 2004/0015556 | A1* | 1/2004 | Chopra | 709/206 |
| 2004/0045016 | A1* | 3/2004 | Romm et al. | 719/328 |
| 2004/0054569 | A1* | 3/2004 | Pombo et al. | 705/7 |
| 2005/0114771 | A1* | 5/2005 | Piehler et al. | 715/536 |
| 2006/0041575 | A1* | 2/2006 | Sciarra | 707/101 |

OTHER PUBLICATIONS

Hein Meling, et al., ARM: Autonomous Replication Management in JGroup, Proceedings of the 4th European Research Seminar on Advances in Distributed Systems, May 2001, pp. 1-6, Bertinoro, Italy.

Managing the Registry, Microsoft Windows 2000 Scripting Guide, Technet Newsletter, http://www.microsoft.com/technet/scriptcenter/scrguide/sas, 2003 Microsoft Corporation, viewed Aug. 12, 2003.

Description of the Windows 2000 Registry, Windows 2000 Resources Kits, Windows 2000 Registry Reference, http://www.microsoft.com/windows2000/techinfo/reskit/en-us/regentry/AboutReg.asp, 2001 Microsoft Corporation, viewed Aug. 12, 2003.

Description of the Technical Reference, Windows 2000 Resource Kits, Windows 2000 Registry Reference, http://www.microsoft.com/windows2000/techinfo/reskit/en-us/regentry/AboutFile.asp. 2001 Microsoft Corporation. viewed Aug. 12, 2003.

Registry Overview, Microsoft Windows 2000 Scripting Guide, Technet Newsletter, http://www.microsoft.com/technet/scriptcenter/scrguide/sas, 2003 Microsoft Corporation, viewed Aug. 12, 2003.

Description of the Microsoft Windows Registry, Microsoft Knowledge Base Article—256986, http://support.microsoft.com/default.aspx, 2003 Microsoft Corporation, viewed Aug. 12, 2003.

Mark Russinovich, Inside the Registry, Windows NT Magazine, Technet Newsletter, http://www.microsoft.com/technet/prodtechnol/winntas/tips/winntmag/inreg.asp, 2003 Microsoft Corporation, viewed Aug. 12, 2003.

"Introduction to Developing Applications for the 64-bit Itanium-based Version of Windows." Microsoft. (Revised Jun. 2003) 12 pages.

European Search Report dated Oct. 17, 2005 mailedOct. 21, 2005 for PCT Application Serial No. 04019207.2, 3 pages.

\* cited by examiner

DYNAMIC REGISTRY PARTITIONING

TECHNICAL FIELD

The present invention relates generally to system registry (ies), and, more particularly to a system and method facilitating dynamic registry partitioning.

BACKGROUND OF THE INVENTION

Many conventional operating systems employ a registry that facilitates storage of information, for example, configuration information. Registry(ies) can serve as an information store for the operating system and for application(s) and service(s) running under the operating system. In one example, the registry stores a wide range of configuration settings ranging from boot parameters to user desktop settings. The registry can be stored as one or more configuration files stored on the storage system of a computer (e.g., persistent and/or non-persistent).

Application(s) can write (e.g., store) information in the registry upon installation. The registry is a hierarchically structured data store comprising subtrees of keys that reference per-computer and/or per-user data stores. A key can include data item(s) called value entries and can further include subkeys. In the registry structure, keys (and subkeys) can be thought of as analogous to directories with value entries being analogous to files. For example, the system registry can change on restart, logon and logoff.

For example, the registry can include the following major sections (e.g., subtrees):
- HKEY_Classes_Root—file associations and OLE information
- HKEY_Current_User—preferences set for current user
- HKEY_User—current user information for each user of the system
- HKEY_Local_Machine—settings for hardware, operating system, and installed applications
- HKEY_Current_Configuration—settings for the display and printers
- HKEY_Dyn_Data—performance data With ever increasing advances in operating system technology, simultaneously permitting both legacy and native applications to coexist has been a daunting task for the operating system, and more specifically, the system registry. For example, different versions of an application can store their configuration information in a common configuration data structure. In fact, different versions of an application typically store their configuration information at a same location within a common configuration data structure. Thus, a later installed version can overwrite existing configuration information for an earlier installed version. As a result, the earlier version is unlikely to run correctly (or at all) because its configuration information has been changed. Sometimes residual configuration exists in the common configuration data structure that can interfere with smooth performance of the later installed version.

Conventionally, compatibly and interoperability problems have occurred when a new version of an operating system (e.g., 32-bit) was introduced. To avoid these types of compatibility problems, the new 32-bit applications were instructed to store their configuration information in a different location (e.g., separate system registries) than the older 16-bit applications. In addition, they were directed to use different names for their application program interface (s) ("APIs") and dynamic link libraries ("DLLs"). Although this conventional solution helped with compatibility and interoperability, it forced software developers to redirect large resources to software conversion rather to development of new or improved software. That is, 16-bit versions of software applications needed to be significantly modified to port to a 32-bit version.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method that provides access to information stored in a system registry, and, further facilitates a generic (e.g., application and/or operating system independent) manner for dynamically partitioning of the system registry. The present invention provides for customized view(s) of the system registry to client(s), component(s) and/or application(s). Customization can be based, for example, on version, computer configuration, user and/or other suitable information. Further, the customized view of the system registry can be manipulated at runtime. Additionally and/or alternatively, low level component(s) (e.g., client(s) and/or application(s)) can also be given access to a dynamic partition data store to manipulate (e.g., add, delete and/or modify) redirection information (e.g., via interface component(s)).

Information can be dynamically provided in response to request(s) based upon the registry partition information stored in the dynamic partition data store. Thus, the requestor (e.g., component(s) and/or application(s)) is provided with current system registry information based, at least in part, upon redirection information stored in the dynamic partition data store. Thus, in accordance with an aspect of the present invention, management program(s) can run application(s) under a customized shell environment that can redirect substantially all system registry call(s), keeping the system registry intact up to a certain point and time. That is, a user can redirect a single write in the system registry in a different location without disrupting the application.

The dynamic partition data store stores redirection information associated with at least one application and the system registry. An interception component receives request (s) (e.g., from application(s)) to access the system registry and returns information associated with the system registry based, at least in part, upon redirection information stored in the dynamic partition data store. For example, the interception component can review an identity and/or characteristic (s) of the requesting entity in determining whether redirection information in the dynamic partition data store is to be utilized.

Redirection information can be stored in the dynamic partition data store (e.g., key/translated key). For example, the dynamic partition data store can be a remapping table in the system that can be dynamically manipulated with the interception component intercepting system service call(s) from a client (e.g., application).

Yet another aspect of the present invention provides for, a particular component (e.g., application) to initialize a view of the system registry (e.g., list) appropriate for the component (e.g., customized view). For example, one or more properties can be associated with the view (e.g., list)— source node, destination node and/or property(ies) (e.g., <NS, ND, P>). A component can update the view (e.g., list) with a different desired element (e.g., <A, B, P>). When a component attempts to access a registry key that falls under the key A and meets property(ies) P, the call is redirected to sub-tree B (e.g., by the interception component). While a single level of redirection has been set forth in this example, it is appreciated that zero, one or more level(s) of indirection and/or cascading rule(s) can be applied to manipulate a particular call.

Thus, in determining whether remapping (e.g., redirection), the interception component can investigate parameter (s) the requesting entity (e.g., client) has passed. Thereafter, in one example, the interception component can construct another set of parameter(s) that matches the requesting entity's (e.g., client's) need and make a native call using the modified set of parameters.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
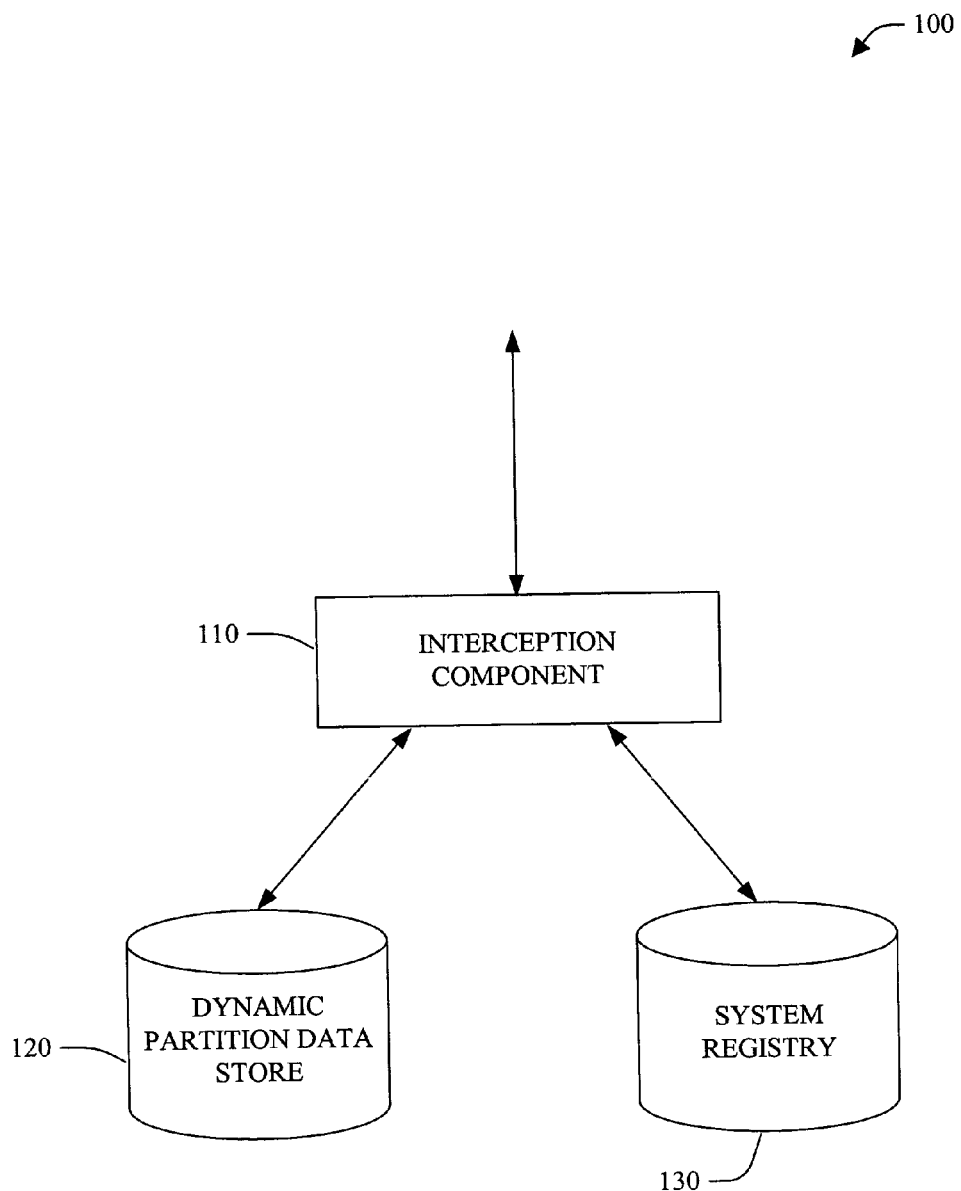
FIG. 1 is a block diagram of a dynamic registry partition system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers. It is to be appreciated that the various systems and/or components can be computer components as that term is defined herein.

Referring to FIG. 1, a dynamic registry partition system 100 in accordance with an aspect of the present invention is illustrated. The system 100 includes an interception component 110 and a dynamic partition data store 120. Optionally, the system 100 can further include a system registry 130. While the system registry 130 is depicted as a single data store, those skilled in the art will recognize that information can be stored directly in the system registry 130 and/or indirectly in the system registry 130 (e.g., by employing a reference, pointer and/or other indirection tool). The scope of the appended claims is intended to encompass all such system registry configuration(s).

The system 100 provides access to information stored in a system registry, and, facilitates a generic (e.g., application and/or operating system independent) manner for dynamically partitioning of the system registry. The present invention facilitates providing a customized view of the system registry 130 to component(s) and/or application(s). For example, customization can be based on version, computer configuration, user and/or other suitable information. Significantly, the customized view of the system registry 130 can be manipulated by the system 100 at runtime (e.g., dynamically manipulated). Additionally and/or alternatively, low level component(s) can also be given access to the dynamic partition data store to manipulate the redirection information (e.g., via interface component(s) (not shown) described below).

Information can be dynamically provided in response to the request based upon the partition information stored in the dynamic partition data store 120. Thus, the requester (e.g., component(s) and/or application(s)) is provided with current system registry information based, at least in part, upon redirection information stored in the dynamic partition data store 120.

For example, a terminal server may desire a different view of the registry based on the logged on user. Further, a shell may desire to have a second view, for example, merging information from different locations in the registry. Conventional system(s) facilitate multiple views; however, support for the multiple views is generally hard coded. Thus, as future requirements are imposed, the registry API is typically required to be modified to support these requirements—thus, backward compatibility is difficult.

Hard-coded changes to the registry can further lead to problems as a plurality of different component can be dependent on the system registry. Changes to the system registry can thus pose problem(s) for legacy applications. For example, conventionally, to support application compatibility/interoperability for 64-bit operating system, the system registry was partitioned at different locations. A hard-coded list of registry keys defined the different locations in different way to compile a view for (1) native application(s); and, (2) legacy (e.g., 32-bit) application(s).

The dynamic partition system 100 is substantially transparent to an application. However, in accordance with an aspect of the present application, an application that desires to exploit the dynamic partitioning of the system registry can be permitted to do so.

Component(s) that desire to show different view(s) of the system registry 130 based, for example, on a version number, can easily accomplish the different view(s) by employing the system 100. COM+ component(s) can also partition the system registry 130 by employing the system 100.

In accordance with yet another aspect of the present invention, management program(s) can run application(s) under a customized shell environment that can redirect substantially all system registry call(s), keeping the system registry intact up to a certain point and time. That is, a user can redirect a single write in the system registry in a different location without disrupting the application.

Finally, an extended and/or customized loading process can be employed which calls DLLs in the operating system based on a signature in an image header. The DLL can load a specific image (e.g., like a COM+ program), and, if applicable, can change the system registry view.

The dynamic partition data store 120 stores redirection information associated with at least one application and the system registry 130. The interception component 110 receives request(s) (e.g., from application(s)) to access the system registry 130 and returns information associated with the system registry 130 based, at least in part, upon redirection information stored in the dynamic partition data store 120. For example, the interception component 110 can review an identity and/or characteristic(s) of the requesting entity in determining whether redirection information in the dynamic partition data store 120 is to be utilized.

Redirection information can be stored in the dynamic partition data store 120 (e.g., key/translated key). For example, the dynamic partition data store 120 can be a remapping table in the system 100 that can be dynamically manipulated with the interception component 110 intercepting system service call(s) from a client (e.g., application).

Further, in accordance with an aspect of the present invention, a sender of the request (e.g., application(s)) is unaware that the return information is based, at least in part, upon redirection information.

The system 100 thus goes beyond the two sets of static views available through conventional system(s). The system 100 facilitates dynamic manipulation of the system registry 130. Thus, in one example, a static system registry is not available (e.g., to support a static registry view). Instead, a particular component (e.g., application) can initialize a view of the system registry 130 (e.g., list) appropriate for the component (e.g., customized view of the system registry 130). For example, one or more properties can be associated with the view (e.g., list)— source node, destination node and/or property(ies) (e.g., <NS, ND, P>). A component can update the view (e.g., list) with a different desired element (e.g., <A, B, P>). When a component attempts to access a registry key that falls under the key A and meets property (ies) P, the call is redirected to sub-tree B (e.g., by the interception component 110). While a single level of redirection has been set forth in this example, it is appreciated that zero, one or more level(s) of indirection and/or cascading rule(s) can be applied to manipulate a particular call.

Thus, in one example, the interception component 110 receives request(s) for information from the system registry 130 (e.g., interception component 110 intercepts call(s) from client(s), for example application(s)) to access the system registry 130). Prior to responding to the request, the interception component 110 reviews the dynamic partition data store 120 to determine whether remapping of the contents of the system registry 130 is appropriate. If so, the interception component 110 returns information associated with the system registry 130 based, at least in part, upon redirection information stored in the dynamic partition data store 120.

In determining whether remapping (e.g., redirection), the interception component 110 can investigate parameter(s) the requesting entity (e.g., client) has passed. Thereafter, in one example, the interception component 110 can construct another set of parameter(s) that matches the requesting entity's (e.g., client's) need and make a native call using the modified set of parameters.

The system registry 130 can be represented, for example, by a hierarchical tree and an application can use any node in the tree supplying a complete path from root to any node in the tree. The dynamic partition data store 120 can serve as a redirection tree to verify if the clients call should go to the node it is trying to access and/or to another node in the system tree.

In one example, a node in the dynamic partition data store 120 has a set of attribute(s) and/or rule(s) that define how remapping is to be performed. For instance, the dynamic partition data store 120 tree need not include substantially all the nodes of the tree of the system registry 130 has, rather it will have those node where an operation (e.g., re-mapping) is to be performed. Therefore, the dynamic partition data store 120 tree can be smaller than the system registry 130 tree. Further the size of the dynamic partition data store 120 can depend upon user defined re-mapping information.

For example, a client (e.g., application) can make a call to access the system registry 130 supplying a substantially complete path to a node. The call typically returns a handle that is a unique number pointing to a location in the system registry 130 tree. The client can make subsequent request(s) using that handle. Typically, the subsequent call(s) utilize the return handle passed as a path which is relative. Thus, if the return handle points to a different location than it was supposed to, the client's (e.g., application's) operation is not affected.

In order to support merged views, the interception component 110 can remap the client's (e.g., application's) call to multiple locations using a set of rules in the dynamic partition data store 120. Thereafter, the interception component 110 determines which location to return to the calling client (e.g., application).

Figure 2:
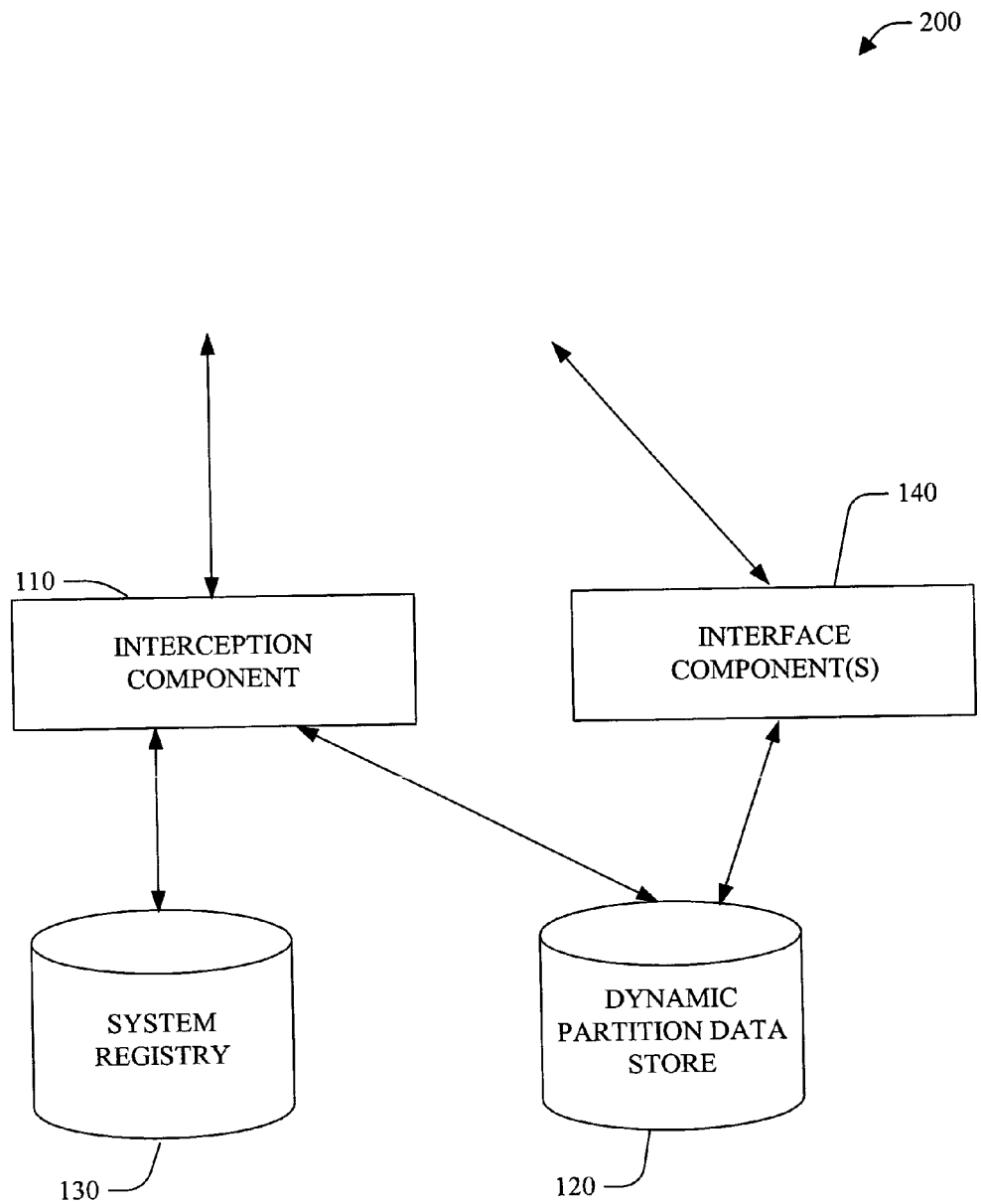
FIG. 2 is a block diagram of a dynamic registry partition system in accordance with an aspect of the present invention.

Turning to FIG. 2, a dynamic registry partition system 200 in accordance with an aspect of the present invention is illustrated. The system 200 can include an interception component 110, a dynamic partition data store and interlace component(s) 140. Optionally, the system 200 can further include a system registry 130.

The interface component(s) 140 facilitate manipulation of a view of the system registry 130 (e.g., by client(s) and/or application(s)). For example, the interface component(s) 140 can be API(s). Exemplary interfaces implemented by the interface component(s) 140 are set forth below:

```
LONG                    // This will add a entry in the remapped table
RegAddRemapEntry (
```

-continued

```
    HKEY hSrc,           // source that is to be remapped
    HKEY hDest,          // destination location where call will go.
    DWORD srcRemapID     // for multiple hive remap. Simply valid Remap-ID
                         // from an earlier call.
    LONG reserve,        // For future use
    LONG Signature,      // Signature to identify that same component is
                         // adding/removing (optional)
    (DWORD *) (filter)   // filtering function that will be called when this
                         // remapping should happen (optional)
    DWORD Flag,          // Flag will dictate the behavior of the mapping like
//merging, for example, entitiy(ies) which get the priority etc. and/or when
// redirection should be effective (e.g., while reading/writing etc.)
    DWORD *RemapID       // Receive a remapped ID that can be used later for
                         // clean-up purpose
)
RegDeleteRemapEntry (
    LONG Signature
    LONG RemapID
)
```

The API(s) can be exported from a DLL. In one example, to define a new classes root, an API is invoked with:

hSrc pointing to: \REGISTRY\Machine\software\Classes
hDest pointing to: User Classes
Flag set—communicating to the API to merge view, "Read" will get preference to hDest first and then hSrc. "Create" will get reference to hSrc and if access denied then to hDest.

In another example, in order to merge multiple hives into a single hive, a third parameter can be employed to cascade multiple views in the system registry 130. Further, to re-map a view with a merged view where hSrc points to Classes Root, and, hDest points to the redirected location.

The system 200 thus facilitates dynamic manipulation of view(s) of the system registry 130. Manipulation can be accomplished, for example, using API(s) available via the interface component(s) 140 with different components employing the API(s) to customize their own view of the registry. Thus, component(s) (e.g., sub-system(s)) can create their own view of the system registry 130 dynamically (e.g., without changing anything in the operating system). Developer(s) of component(s) (e.g., application(s)) are accordingly relieved of the burden of hard-coding entry into the system registry 130 in order to create their own view of the system registry. Additionally, the system registry 130 is more manageable than in conventional systems.

Thus, in accordance with an aspect of the present invention, a shell employing the system 200 can define its own merged view of the system registry 130. In accordance with another aspect of the present invention, application(s) are able to define their own merged view(s), for example, taking different sub-tree(s) from different locations in the system registry 130. Further, OLE and/or COM activation code can define their own set of rules so that underlying application(s) can launch the correct component. For example, based on parameter(s), a first component (e.g., URT) can redefine the dynamic partition data store 120 that affects substantially all the application(s) managed by the first component.

Figure 3:
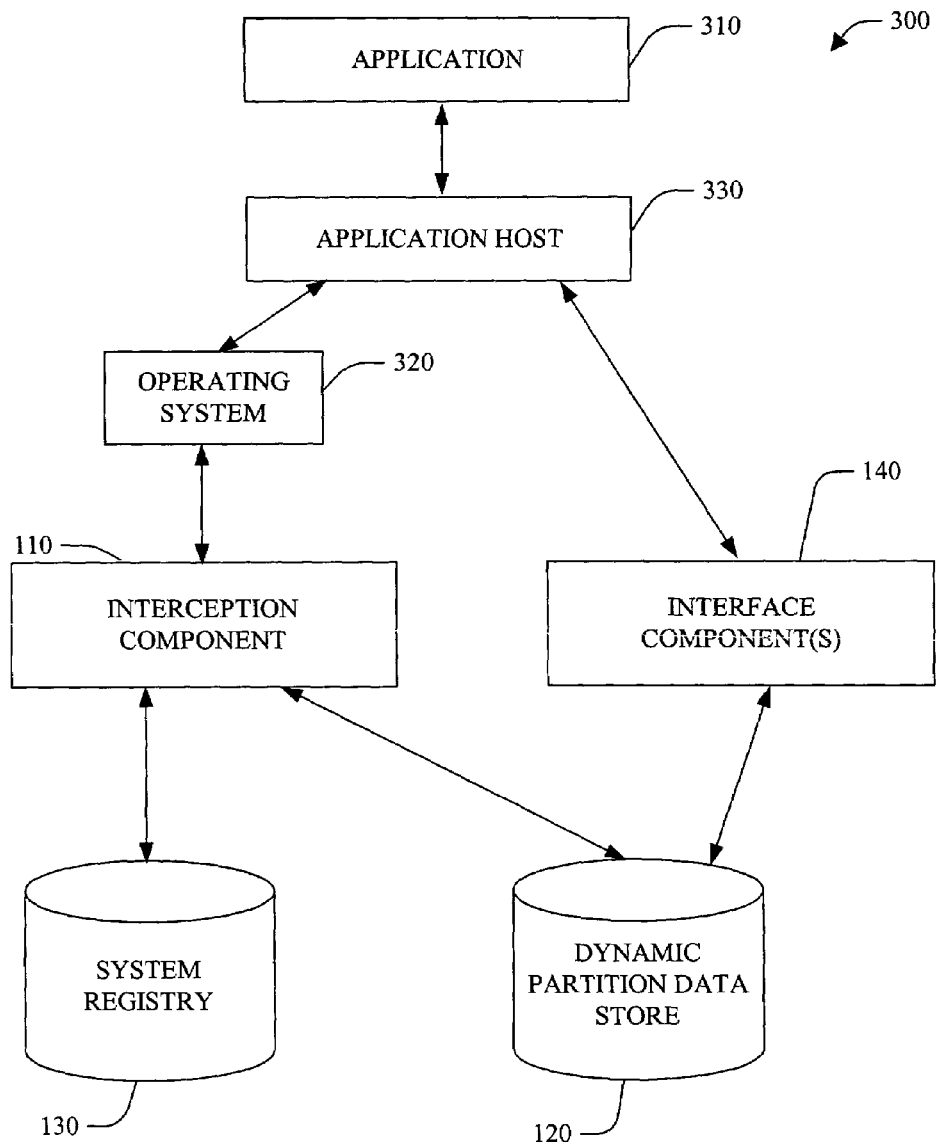
FIG. 3 is a block diagram of a dynamic registry partition system in accordance with an aspect of the present invention.

Referring next to FIG. 3, a dynamic registry partition system 300 in accordance with an aspect of the present invention is illustrated. The system 300 includes an interception component 110, a dynamic partition data store 120, a system registry 130, interface component(s) 140, an application 310, an operating system 320 and an application host 330. The application host 330 can include, for example, an application loader, operating system component(s), for example, compatibility layer, and/or platform framework. For example, the application host 330 can facilitate initialization and/or manipulation of information stored in the dynamic partition data store via the interface component(s) 140.

Generally, request(s) for system registry information are sent from the application 310 to the application host 330 (e.g., application loader, operating system component(s), for example, compatibility layer, and/or platform framework). The application host 330 provides information associated with the request(s) to the operating system 320. Thereafter, the operating system 320 sends a request for system registry information to the interception component 110.

The interception component 110 provides system registry information back to the operating system. If redirection information associated with the request is stored in the dynamic partition data store 120, the information provides is based, at least in part, upon redirection information stored in the dynamic partition data store 120. The operating system 320 then provides the system registry information to the application 310 via the application host 330. However, the system 300 further facilitates manipulation of the redirection information stored in the dynamic partition data store 120 by the application 310. Accordingly, the application 310 can provide a request to add, delete and/or modify redirection information stored in the dynamic partition data store 120 to the interface component(s) 140 via the application host 330.

Figure 4:
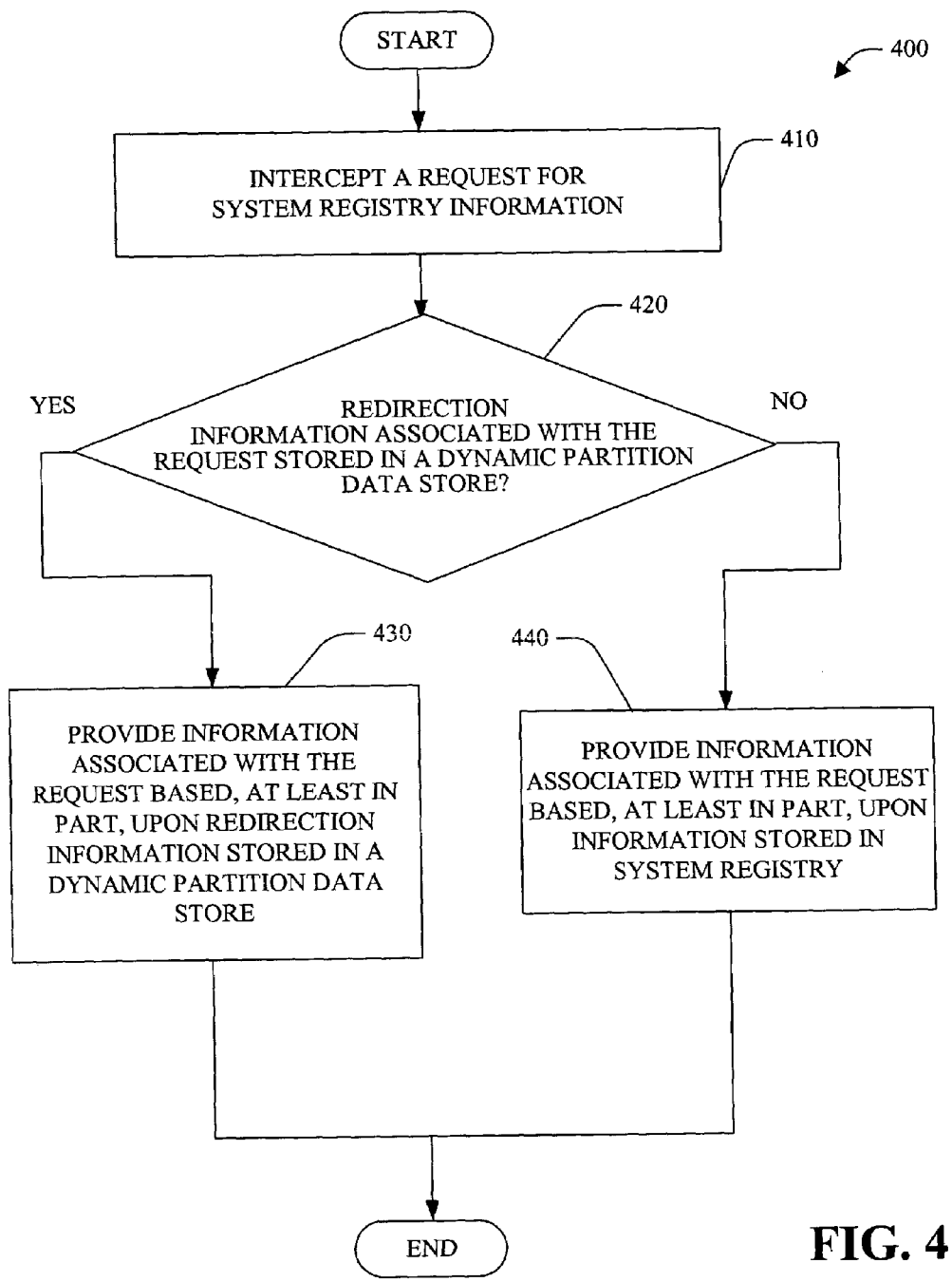
FIG. 4 is a flow chart of a method facilitating dynamic registry partitioning to support multiple registry views in accordance with an aspect of the present invention.
Figure 5:
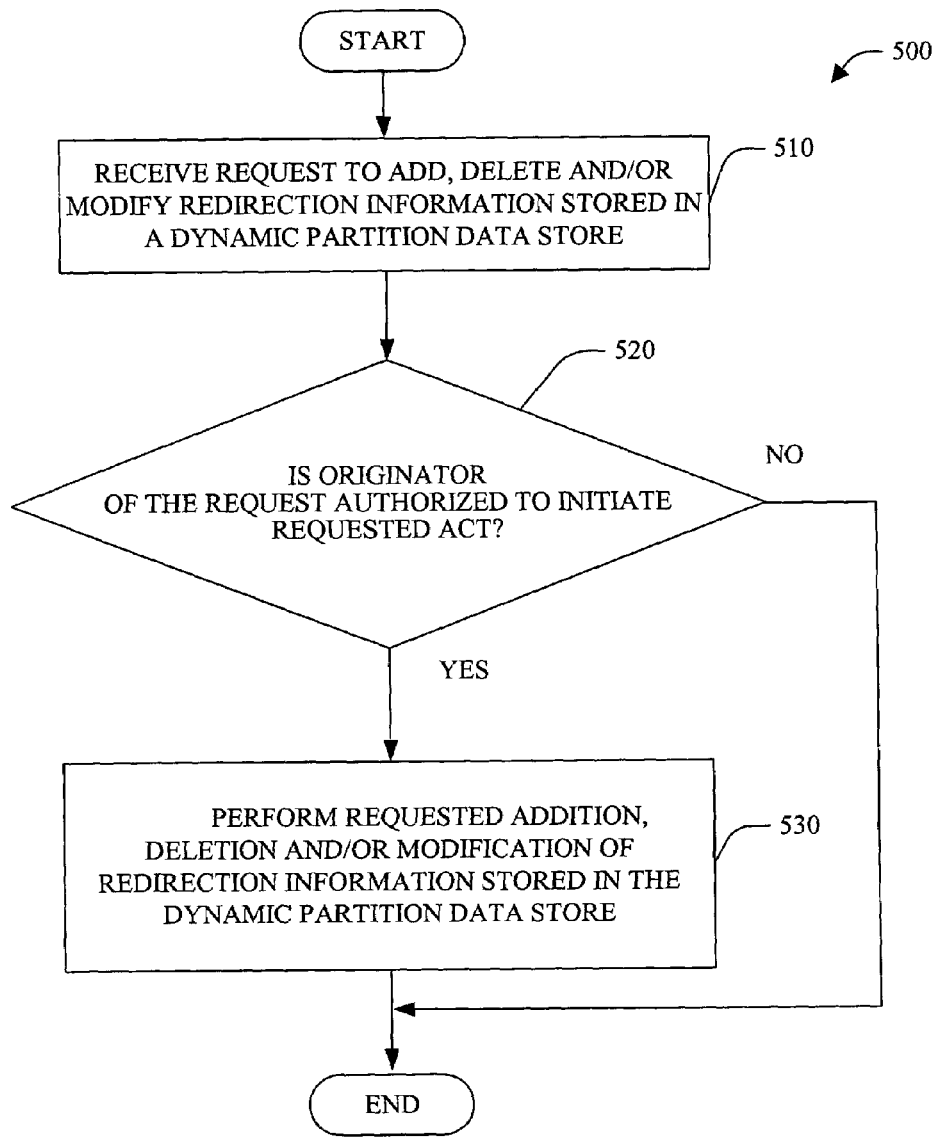
FIG. 5 is a flow chart of a method of interfacing with a dynamic partition data store in accordance with an aspect of the present invention.

Turning briefly to FIGS. 4 and 5, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 4, a method 400 facilitating dynamic registry partitioning to support multiple registry views in accordance with an aspect of the present invention is illustrated. At 410, a request for system registry information is intercepted (e.g., by an interception component 110). At 420, a determination is made as to whether redirection information associated with the request is stored in a dynamic partition data store.

If the determination at 420 is YES, at 430, information associated with the request based, at least in part, upon redirection stored in a dynamic partition data store. For example, the information can be provided to a requesting client. The information can be based upon a version, an identity and/or characteristic(s) of the requesting entity in determining whether redirection information in the dynamic partition data store is to be utilized, and, no further processing occurs. If the determination at 420 is NO, at 440, information associated with the request is provided based, at least in part, upon information stored in the system registry and no further processing occurs.

Next, turning to FIG. 5, a method 500 of interfacing with a dynamic partition data store in accordance with an aspect of the present invention is illustrated. At 510, a request to add, delete and/or modify redirection information stored in the dynamic partition data store is received (e.g., by interface component(s) 140). At 520, a determination is made as to whether an originator of the request is authorized to initiate the requested act (e.g., addition, deletion and/or modification). If the determination at 520 is YES, at 530, the requested addition, deletion and/or modification of redirection information stored in the dynamic partition data store is performed, and, no further processing occurs. If the determination at 520 is NO, no further processing occurs.

Figure 6:
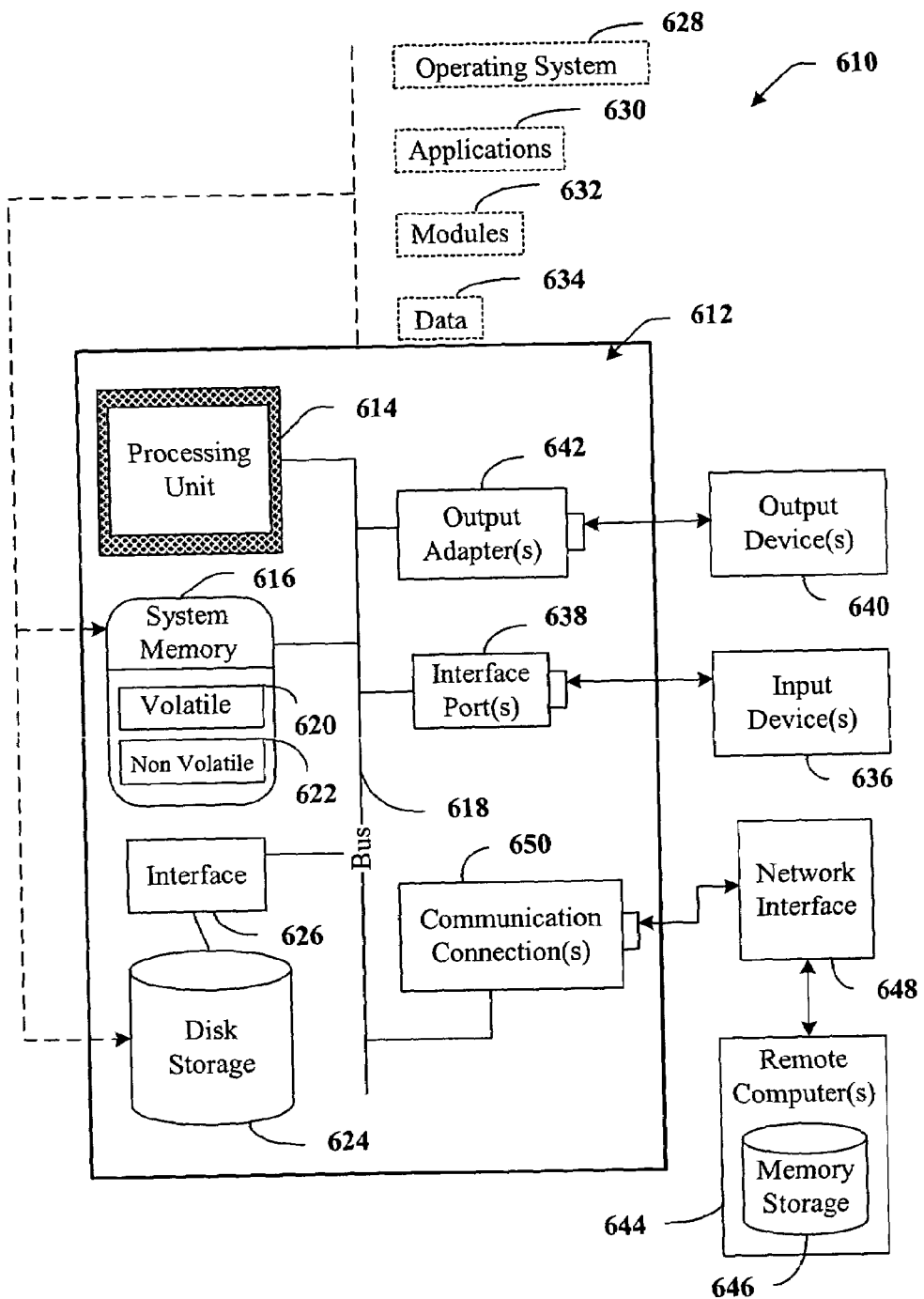
FIG. 6 illustrates an example operating environment in which the present invention may function.

In order to provide additional context for various aspects of the present invention, FIG. 6 and the following discussion are intended to provide a brief, general description of a suitable operating environment 610 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 610 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 6, an exemplary environment 610 for implementing various aspects of the invention includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/nonremovable, volatile/nonvolatile computer storage media. FIG. 6 illustrates, for example a disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in suitable operating environment 610. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the present invention can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers among other output devices 640 that require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A dynamic registry partition system comprising:
    a dynamic partition data store that stores redirection information associated with at least one application and a system registry; and,
    an interception component that receives a request to access the system registry and returns information associated with the system registry based, at least in part, upon redirection information stored in the dynamic partition data store, the returned information comprises at least one customized view of the system registry, the at least one customized view dynamically manipulable based at least in part on a user associated with an originator of the request.

2. The system of claim 1, the request is received from an application.

3. The system of claim 1, further comprising an interface component that facilitates runtime manipulation of redirection information stored in the dynamic partition data store.

4. The system of claim 3, the interface component receiving a request to perform at least one of an addition, a deletion and a modification to at least some of the redirection information stored in the dynamic partition data store.

5. The system of claim 4, the request to perform comprises a source node, destination node and at least one property.

6. The system of claim 1, the dynamic partition data store comprises a remapping table.

7. The system of claim 1, the returned information is based, at least in part, upon a version and a computer configuration.

8. The system of claim 1, redirection information stored in the dynamic partition data store can be manipulated at runtime.

9. The system of claim 1, an application can manipulate redirection information stored in the dynamic partition data store.

10. The system of claim 1, the dynamic partition data store comprising a set of at least one of an attribute and a rule that define how redirection is to be performed.

11. An operating system that receives the return information provided by the system of claim 1.

12. A method facilitating dynamic registry partitioning to support multiple registry views comprising:
    intercepting a request for system registry information; and,
    providing information associated with the request based, at least in part, upon redirection information stored in a dynamic partition data store, the information associated with the request includes one or more customized views of the system registry, the one or more customized views manipulable based on a user associated with an originator of the request.

13. The method of claim 12, further comprising receiving a request to modify information stored in the dynamic partition data store.

14. The method of claim 12, further comprising:
    determining whether redirection information associated with the request is stored in the dynamic partition data store; and,
    providing information associated with the request based, at least in part, upon information stored in the system registry, if redirection information is not stored in the dynamic partition data store.

15. A computer readable medium having stored thereon computer executable instructions for carrying out the method of claim 12.

16. A method of interfacing with a dynamic partition data store comprising:
    receiving a request to modify redirection information, the redirection information stored in the dynamic partition data store;

determining whether an originator of the request is authorized to initiate the modification;

modifying the redirection information in accordance with the request, if the originator of the request is authorized to initiate the modification; and providing a customized view of the modified redirection information, the customized view dynamically manipulable based at least in part on the originator of the request and the redirection information.

17. A computer readable medium having stored thereon computer executable instructions for carrying out the method of claim 16.

18. A method of interfacing with a dynamic partition data store comprising:

receiving a request to add redirection information, the redirection information stored in the dynamic partition data store;

determining whether an originator of the request is authorized to initiate the addition;

adding the redirection information in accordance with the request, if the originator of the request is authorized to initiate the addition; and generating a customized view of the added redirection information, the generated customized view manipulable based on the redirection information and the authorization of the originator.

19. A computer readable medium having stored thereon computer executable instructions for carrying out the method of claim 18.

20. A method of interfacing with a dynamic partition data store comprising:

receiving a request to delete redirection information, the redirection information stored in the dynamic partition data store;

determining whether an originator of the request is authorized to initiate the deletion;

deleting the redirection information in accordance with the request, if the originator of the request is authorized to initiate the deletion; and based at least in part on the deleting, creating one or more customized view, the one or more customized view dynamically changeable based on the redirection information and a user associated with the originator of the request.

21. A computer readable medium having stored thereon computer executable instructions for carrying out the method of claim 20.

22. A computer readable medium storing computer executable components of a dynamic registry partition system comprising:

an interception component that receives a request to access a system registry and returns information associated with the system registry based, at least in part, upon redirection information stored in a dynamic partition data store, the interception component creates a customized view of the system registry associated with the returned information, the customized view selectively changeable based at least on a user associated with an originator of the request.

23. A dynamic registry partition system comprising:

means for dynamically storing redirection information associated with at least one application and a system registry; and, means for intercepting a request to access the system registry;

means for providing return information in response to the request, the return information being associated with the system registry and based, at least in part, upon redirection information stored in the means for dynamically storing redirection information, the returned information including one or more customized views of the system registry, the one or more customized views dynamically changeable based on a user associated with the request and the redirection information.

* * * * *